United States Patent Office 3,745,151
Patented July 10, 1973

3,745,151
POLY-ε-CAPROLACTAM FILAMENT USEFUL
FOR TIRE CORD
Hiromu Takeda, Otsu, Etsuji Oda and Rokuro Sakai, Okazaki, and Masamitsu Tanimura, Otsu, Japan, assignors to Toray Industries, Inc., Tokyo, Japan
Continuation-in-part of abandoned application Ser. No. 741,925, July 2, 1968. This application Feb. 8, 1971, Ser. No. 97,432
Claims priority, application Japan, July 4, 1967, 42/42,556; July 8, 1967, 42/43,786, 42/43,787
Int. Cl. C08g 20/12
U.S. Cl. 260—78 L 2 Claims

ABSTRACT OF THE DISCLOSURE

Poly-ε-caprolactam filament useful for tire cord having a high tenacity and uniformity is produced by a method in which a filament spun from a poly-ε-caprolactam having a relative viscosity higher than 2.9 is immediately drawn in at least two successive stages wherein the spun filament is drawn in at least one earlier stage into a primary drawn filament having no measurable birefringence and then the primary drawn filament is further drawn to provide a selected total draw ratio. The drawn filament in at least one drawing stage has a γ-form crystalline structure content Cγ defined by $0.65 \leq C\gamma \leq 0.90$.

---

This application is a continuation-in-part of our co-pending application Ser. No. 741,925 filed July 2, 1968, now abandoned and relates to filaments produced by the method described and claimed in our application Ser. No. 113,414, now abandoned, filed concurrently herewith also as a continuation-in-part of application Ser. No. 741,925.

This invention relates to high tenacity poly-ε-caprolactam filament having superior uniformity, mechanical properties and physical properties.

Poly-ε-caprolactam filament, namely nylon 6 filament, is being widely used today for clothing and also in the industrial fields but with the recent increase in speed of transportation vehicles, nylon 6 filaments having high tenacity, superior thermosetting properties and also small work loss are being looked forward to for use as yarns for tire cords and, furthermore, the necessity of a method for manufacturing such filaments at high efficiency and also stably is being felt.

The object of this invention is to provide poly-ε-caprolactam filaments of a new construction having superior properties especially for use as yarns for tire cord. The method of the present invention will be described with reference to the accompanying drawings in which.

Figure 1:
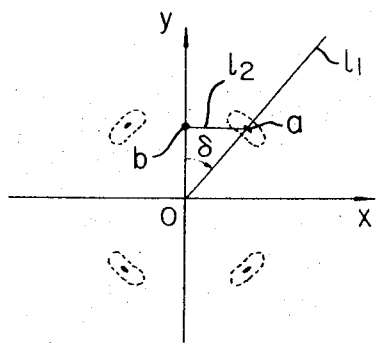
FIG. 1 is a graphic representation of the 4-point interference of the X-ray low-angle interference image of the filament.

The nylon 6 filaments for tire cord in accordance with this invention have a novel structure characterized by superior strength, thermosetting and work recovery properties, and by low thermal shrinkage and wet shrinkage. The structure of the filaments is defined by an X-ray low-angle interference image characterized by a 4-point interference pattern in which the relations between the strength and position of a point which has the maximum strength of interference image are:

$$\delta = 35° \pm 5°; \quad 0.50 \leq I_M/I_P \leq 0.89$$

where $\delta$ is an angle formed by a meridian and a straight line drawn from an intersection of the meridian and an equator line toward a point indicating a maximum strength in the X-ray low-angle interference image, $I_P$ is an interference strength at a point indicating the aforementioned maximum strength and $I_M$ is an interference strength at a point where a straight line extending toward a meridian parallel to an equator line from the point indicating the maximum strength and the meridian intersect. Furthermore:

$$S \times E \geq 207.0; \quad 15 \leq E \leq 35$$

and preferably:

$$S \times E \geq 220.8; \quad 23 \leq E \leq 32, \quad S \geq 9.2$$

where S is the tenacity of the filament indicated in g./d. and E is a breaking elongation of the filament indicated in percent.

The poly-ε-caprolactam filament of the present invention having an $S \times E$ value of at least 207.0, has a long life against repeated bendings of at least about 500 minutes, and a low relax shrinkage of at most 6%, which shrinkage is measured according to the Goodyear Tube Fatigue Method, ASTM Standard 1964, Part 25.

Accordingly, when the poly-ε-caprolactam filament of the present invention is utilized as a tire cord, the above-stated properties of the filament result in a very long life span and a very high dimensional stability of the tire cord.

Further, when the poly-ε-caprolactam filament of the present invention which has a specified X-ray low-angle interference image wherein $\delta + 35° \pm 5°$ and $$0.50 \leq I_M/I_P \leq 0.89$$

is formed into a tire cord and subjected to a vulcanization process at a high temperature, the specified structure of the filament results in a much lower decrease of tenacity, which decrease is due to the high temperature of the process. Though the decrease of tenacity of the tire cord by the vulcanization depends on the kind of tire and processing condition, the filament of the present invention retains at least about 90% tenacity with respect to the original tenacity after the conventional vulcanization. This feature of the filament of the present invention results in a high processability of vulcanization. It must first be noted that the 4-point interference characterizing the X-ray low-angle interference pattern of the nylon 6 filament of this invention defines a new filament structure. That is, it was not known previously that nylon 6 filament indicates a 4-point interference and according to K. Hess and H. Kiessing, Kolloid Z., 130 [1] 10-19 (1953), a 4-point interference pattern does not appear even when heat treatment is carried out and it is only known in the literature that interference appears on the meridian. Also, W. O. Statton described measurement of the long peirod of nylon 6 filament in Journal Polymer Science, 41, 143 (1959) but the appearance of 4-point interference is not reported even in this.

The present inventors have discovered the fact that a poly-ε-caprolactam filament having four-point interference in the X-ray low-angle interference image, which filament was not known previously, is produced by the novel method described in detail hereunder, and have also found that the aforementioned filaments of this invention have characteristics which are particularly desirable in yarns for making tire cords.

The aforementioned relations of $\delta$, $I_M$ and $I_P$ were determined as follows: That is, the X-ray low-angle interference image of the filament was obtained and this was indicated graphically. For example, as shown in FIG. 1, when a straight line ($l_1$) is drawn from the intersection (O) of meridian (Y) and equator line (X) toward the point of maximum strength ($a$) in the interference image, the angle formed between the meridian (Y) and the straight line ($l_1$) is $\delta$, the strength of point ($a$) indicating the aforementioned maximum strength is $I_P$ and the interference strength at point ($b$) where straight line ($l_1$) drawn parallel to equator line (X) toward meridian (Y) from point ($a$) intersects with the meridian (Y) is $I_M$.

Next, it is noteworthy that $\delta = 35° \pm 5°$ and $$0.50 \leq I_M/I_P \leq 0.89$$

That is, the characteristic of nylon 6 filament which is the objective of this invention is not simply nylon 6 filament indicating 4-point interference. That is, the position of the maximum strength of the interference image in the 4-point interference is important, as is clear from the examples described hereunder and, furthermore, the strength of the maximum strength in the interference image is an important factor.

Besides the above conditions, $S \times E \geq 207.0$; $15 \leq E \leq 35$, preferably $S \times E \geq 220.8$, $23 \leq E \leq 32$, $S \geq 9.2$ must be satisfied.

The nylon 6 filaments of this invention which are defined by these conditions have superior strength, thermosetting properties and work recovery, and have low thermal shrinkage and wet shrinkage, and are particularly useful as filaments for tire cords.

The aforementioned values of S and E are measured according to ASTM Designation, D885–64T (1963) Test for Tire Cords from Man-Made Fibers.

Nylon 6 filaments which satisfy the aforementioned conditions are produced according to the following method.

Nylon 6 chips with relative viscosity higher than 2.9, and preferably higher than 3.0, are melted and are extruded through a spinneret into filament form. The resulting filaments are cooled to solidify them, and the undrawn filaments are immediately drawn by a drawing process which is carried out by more than two drawing stages. The aforementioned undrawn filaments are drawn in the early drawing stages so that no measurable birefringence is indicated, next, at least one later drawing stage is carried out to draw the filaments to the total drawing ratio. Between the time the filaments are extruded and the drawing process, the filaments are not wound on a bobbin or other package but go directly to the drawing rolls. It is preferable to have the elapsed time from the solidification of the filaments to the start of drawing shorter than 10 seconds. Such a process is herein referred to as a freshly spinning and drawing process.

Figure 7:
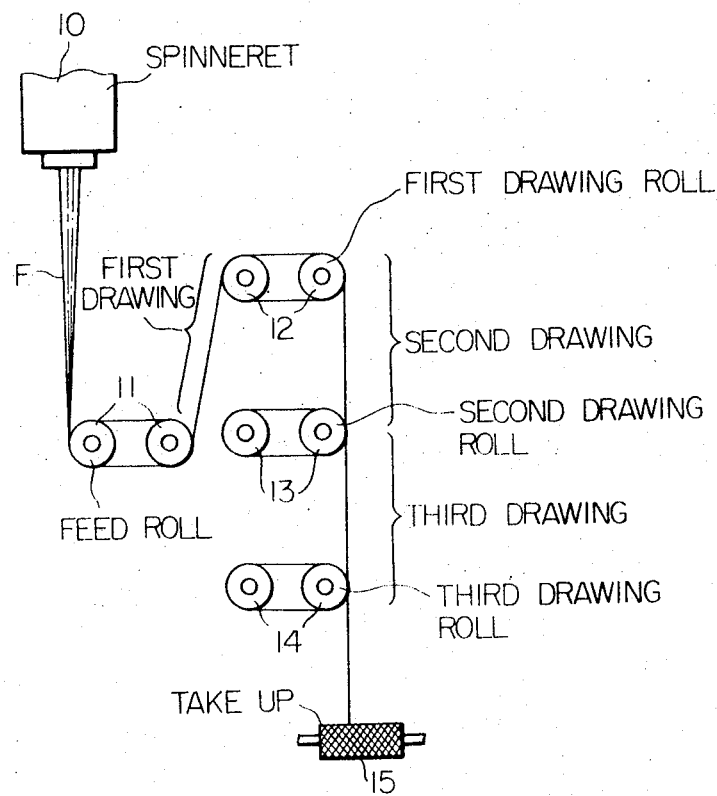
FIG. 7 is a schematic illustration of apparatus for producing the filament of the invention.

Apparatus for carrying out the spinning and drawing process herein described is illustrated schematically in FIG. 7. The apparatus is shown as comprising a spinneret 10 for producing filaments F which are cooled to solidify them as they leave the spinneret and then pass successively over feed rolls 11, first drawing rolls 12 second drawing rolls 13 and third drawing rolls 14. The filaments are subjected to a first drawing stage between the feed rolls 11 and first drawing rolls 12, to a second drawing stage between the first drawing rolls 12 and the second drawing rolls 13, and to a third drawing stage between the second drawing rolls 13 and third drawing rolls 14. Additional drawing rolls may be provided in like manner to provide the total number of drawing stages desired. The drawn filaments then pass to a take-up 15.

The relative speeds of the feed rolls and the several sets of drawing rolls are selected as well known in the art to provide the desired drawing ratio in each stage and the total drawing ratio. In at least the initial drawing stage, the ratio of draw is such that the drawn filaments exhibit no measurable birefringence. Further drawing is such that the content $C\gamma$ of the $\gamma$-form structure of the filament is in the range of $0.65 \leq C\gamma \leq 0.90$ and preferably in the range of $0.70 \leq C\gamma = 0.87$ in at least one drawing stage. The total drawing ratio is determined by the size of the extruded filament and the desired size of the final filament. As an example, in a three-stage drawing process, the successive drawing ratios may be 1.5 to 2.0 and 1.6 with a total draw ratio of 4.8, the ratio in each stage being given with respect to the previous stage.

The relative viscosity of the poly-$\epsilon$-caprolactam designated as nylon 6 is measured by the following method. The nylon 6 is dried so that the moisture content is below 0.005%, and 0.250 g. of this is weighed accurately to $\pm 0.002$ g. and added to 25 cc. of 98% sulfuric acid at 25° C. The polymer is dissolved completely in the sulfuric acid by heating for four hours at $60° \pm 5°$ C. with occasional shaking. After it has dissolved completely, the viscosity of the solution is determined with an Ostwald viscometer in a constant temperature bath whose temperature is set at $25° \pm 0.01°$ C. by measuring the flow time in the viscometer for the solution ($t_s$) and for the solvent ($t_0$). The relative viscosity can be obtained from the following relation:

$$\eta\gamma = \frac{t_s}{t_0}$$

Birefringence in filaments indicates that anisotropy is present in the internal structure of the filament and birefringence indicates that anisotropy is not present in the structure, or even if it is present, its presence is very small. It follows therefore that if nylon 6 filaments are spun under a condition such that there is practically no absorption of moisture, no birefringence is measurable.

Filaments in which birefringence is immeasurable can be manufactured by the method of said application Ser. No. 113,414, now abandoned, in which the frequency of filament breakage and formation of necking are reduced considerably, uniform drawing is made possible at high efficiency, and the X-ray low-angle interference image indicates a 4-point interference.

The importance of measuring birefringence is next explained. In this invention, it is important to know the birefringence in a condition into which the filament is being transformed. That is, birefringence, particularly birefringence in a condition which should be measured in this invention, fluctuates in accordance with the atmospheric condition and, consequently, sampling must be carried out particularly carefully. Therefore, in order to maintain the sample so that the atmospheric condition does not affect the sample during sampling or measurement, measurement must be made by cooling completely dried fluid paraffin to at least below room temperature with the sampled filaments dipped in the paraffin.

The reason for the marked reduction in the frequency of filament breakage and formation or necking, and uniform drawing at high efficiency when the method of manufacturing nylon 6 according to this invention is used is next explained. That is, the reason why such superior effects can be obtained are, firstly, an undrawn filament in which the presence of anisotropic structure is very small is drawn and is transformed easily into an elongated structure of this molecular chain from a folded structure of this molecular chain or very similar structure; secondly, it is due to the small reduction in free volume by progress in the volume relaxation phenomenon of the undrawn filament because the time from coagulation to drawing is very short; thirdly, during the process of transition from the folded structure of the molecular chain to the elongated structure, the tensile load which is borne by the structural defect formed temporarily is small; and fourthly, the formation of the aforementioned structure defect is small and formation of the stable structure is carried out smoothly.

Next, another feature of the method of manufacturing the nylon 6 filaments according to this invention is that in the multiple stage drawing method, the filaments are drawn in the drawing process such that the content $C\gamma$ of the $\gamma$-form structure of the filament is in the range of $0.65 \leq C\gamma \leq 0.90$, and preferably in the range of $0.70 \leq C\gamma \leq 0.87$ during at least one drawing stage.

There are 3 types of crystal structures of nylon 6 filaments, that is $\alpha$-form, $\gamma$-form and $\beta$-form crystal structures but when undrawn filaments are drawn by multiple stage drawing, the filaments take the $\gamma$-form structure at least during one intermediate drawing stage and during the subsequent drawing stage transition to the $\alpha$-form structure takes place, by which it was found that high speed drawing of nylon 6 filaments having good properties can be produced.

The following examples are illustrative of the present invention but are not to be construed as limiting the same.

EXAMPLE 1

Nylon 6 chips whose relative viscosity $\eta\gamma$ is 3.40, oligomer content 1.6% and moisture content 0.003% are melt spun at 300° C. Melt spinning is carried out with the conventional melt spinning equipment. The spun filaments are cooled from 300° C. to 37° C. within 0.2 second to solidify them. The undrawn filaments thus obtained are successively sent directly from the said spinning process to the drawing process and immediately drawn. This drawing process is composed of 4 stages of successive drawing zones and the drawing rate of the undrawn filaments in each drawing zone is distributed as shown in Table 1. In Table 1, the birefringence and content or $\gamma$-form structure are also indicated. No. 1 is a product according to the method of this invention and No. 2 is a product according to a method other than that of this invention.

TABLE 1

| No. | Drawing stages | | Drawing rate with respect to the undrawn filaments in each drawing stage | | | | Filament breakage during drawing No. of times per 24 hours | Fibrils number per 10⁴m. | Tenacity, g./d. | Breaking elongation | Relaxed shrinkage, percent |
|---|---|---|---|---|---|---|---|---|---|---|---|
| | | | 1.20 | 2.00 | 3.00 | 5.41 | | | | | |
| 1 | 4 | $\Delta n(\times 10^{-3})$ | (¹) | (¹) | 32.4 | 58.1 | 0~3 | 0~4 | 9.35(0.200) | 24.9(0.35) | 1.9 |
| | | $C\alpha$ | 0.40 | 0.55 | 0.75 | 0.42 | | | | | |
| | | $\Delta n(\times 10^{-3})$ | 5.0 | 19.1 | 45.0 | 58.5 | | | | | |
| 2 | 4 | $C\gamma$ | 0.42 | 0.41 | 0.50 | 0.42 | 50~70 | Over 25 | 8.01(0.780) | 18.5(0.891) | 8.3 |

¹ Unmeasurable.

It is particularly necessary for the content $C\gamma$ of the $\gamma$-form structure in the intermediate drawing stage to be in the range of $0.65 \leq C\gamma \leq 0.90$, and preferably in the range of $0.70 \leq C\gamma \leq 0.87$. For this purpose, it is necessary to avoid excess concentration of tension and to control the drawing velocity appropriately during the drawing process.

Content $C\gamma$ of the $\gamma$-form structure can be calculated chiefly by measuring the infrared spectrum. The measurement and calculation methods are described hereunder.

First, the filaments are sliced into the thin pieces of about 15$\mu$ with a microtome and 1.6 mg. of this is weighed accurately. This is added to 200 mg. of KBr powder and mixed thoroughly. After mixing, this is molded into a disc of 10 mm. diameter with a compression molder. It is desirable to have the mixture of the sample and KBr in the disc form sufficiently transparent optically. The infrared spectrum of the sample molded in disc form is then measured. The characteristic band of the $\gamma$-form structure appears at 974 cm.$^{-1}$ and that of $\alpha$-form crystal at 928 cm.$^{-1}$, from which the change in the relative absorbance is measured. The particulars are shown in FIG. 2.

Figure 2:
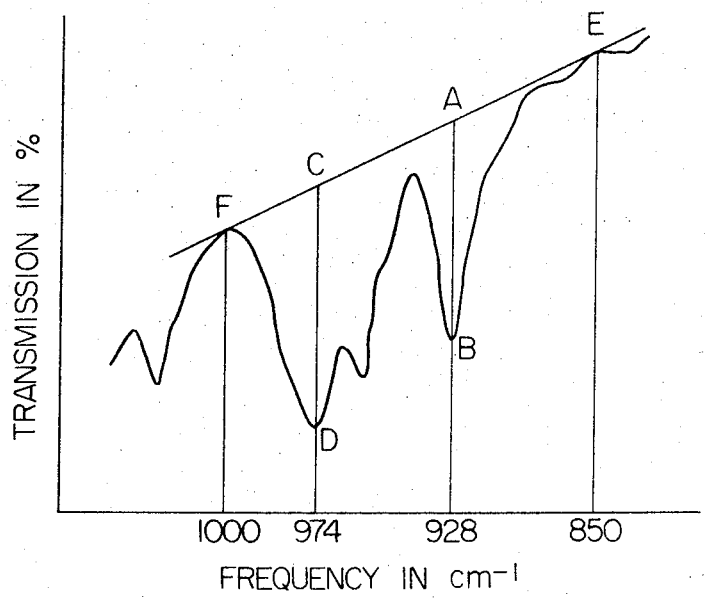
FIG. 2 is the infrared absorption spectrum of the filament.

Next, the method of calculating the content of the $\gamma$-form structure in FIG. 2 is explained.

(1) The spectra of wave numbers 850 cm.$^{-1}$ and 1,000 cm.$^{-1}$ are joined with a straight line EF and this is taken as the base line.

(2) Straight lines CD and AB are drawn from the straight line EF for characteristic bands 974 cm.$^{-1}$ and 928 cm.$^{-1}$, respectively, and the transmittance T974 cm.$^{-1}$ and T928 cm.$^{-1}$ are obtained.

(3) Content $C\gamma$ of $\gamma$-form structure is obtained from this result by using the following equation:

$$C\gamma = \frac{T974 \text{ cm.}^{-1}}{T974 \text{ cm.}^{-1} + T928 \text{ cm.}^{-1}}$$

X-ray wide-angle diffraction pattern is obtained in parallel with the measurement of infrared absorption spectra and these are made to correspond to each other. The base line method which is ordinarily carried out is used for obtaining absorbance.

Figures in ( ) in the table indicates dispersion.

Next, a comparison of the characteristics of nylon 6 filaments obtained according to No. 1 in accordance with the invention and nylon 6 filaments obtained by No. 2 other than that of this invention and which do not satisfy the aforementioned conditions is shown in Tables 2A and 2B.

TABLE 2A

| No. | $\delta$ | $I_M/I_P$ | $S \times E$ | E | Work recovery rate at 16% elongation | Relaxed shrinkage, percent |
|---|---|---|---|---|---|---|
| 1 | 34.8 | 0.78 | 232.7 | 24.9 | 58.2 | 1.9 |
| 3 | 35.0 | 0.77 | 222.0 | 24.5 | 57.1 | 2.3 |
| 4 | 30.0 | 0.72 | 222.0 | 24.0 | 56.1 | 3.4 |
| 5 | 40.0 | 0.81 | 210.0 | 23.5 | 56.1 | 3.7 |
| 6 | 36.0 | 0.80 | 223.1 | 23.8 | 56.9 | 1.9 |
| 7 | 35.1 | 0.50 | 210.1 | 22.5 | 57.0 | 4.0 |
| 8 | 36.1 | 0.89 | 215.1 | 23.5 | 55.6 | 2.3 |
| 9 | 30.1 | 0.85 | 222.1 | 21.3 | 56.3 | 3.6 |
| 10 | 36.9 | 0.65 | 230.1 | 24.5 | 50.6 | 5.9 |
| 11 | 24.5 | 0.90 | 203.3 | 23.0 | 51.9 | 6.5 |
| 12 | 23.0 | 0.92 | 201.8 | 22.5 | 52.1 | 7.8 |
| 13 | 41.8 | 0.93 | 215.8 | 22.5 | 57.5 | 3.9 |
| 14 | 24.5 | 0.91 | 206.8 | 21.2 | 51.9 | 7.0 |

TABLE 2B

| No. | Resistance against repeated bending (minutes) | Processability in vulcanization | Ratio of tenacity retained after vulcanization to the original tenacity in percent |
|---|---|---|---|
| 1 | 550 | Good | 94 |
| 3 | 545 | do | 96 |
| 4 | 550 | do | 91 |
| 5 | 519 | do | 91 |
| 6 | 548 | do | 95 |
| 7 | 514 | do | 94 |
| 8 | 521 | do | 94 |
| 9 | 542 | do | 90 |
| 10 | 561 | Fair | 97 |
| 11 | 448 | Not good | 84 |
| 12 | 432 | do | 85 |
| 13 | 505 | Good | 87 |
| 14 | 450 | Not good | 83 |

Figure 3:
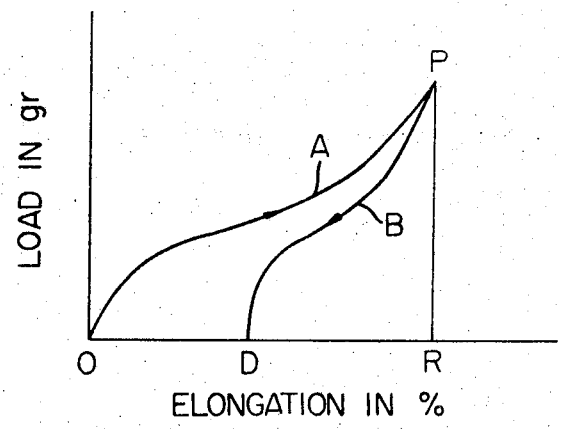
FIG. 3 is the load-elongation history curve of the filament.
Figure 4:
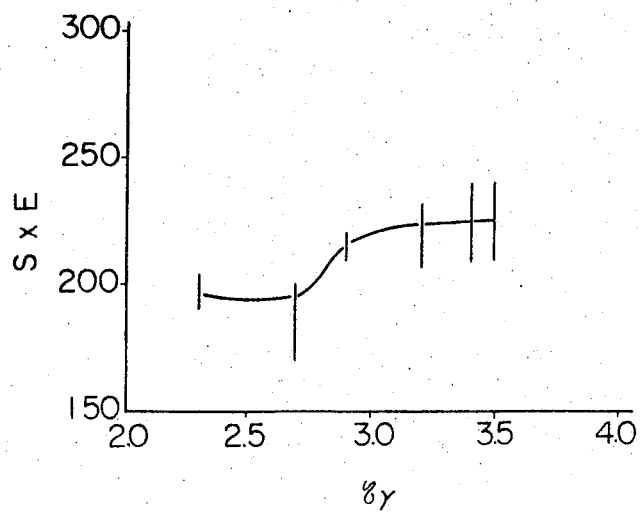
FIG. 4 is a curve showing the relationship between the relative viscosity of the raw material polymer according to an example of this invention and the product of the strength and elongation.

The work recovery rate was determined by the following method:

Curve A in the load-drawing history graph indicated in FIG. 3 shows the drawing curve and curve B the recovery curve, and the recovery rate is expressed by $$\frac{\text{Area DPR}}{\text{Area OPR}} \times 100$$

Also, the relaxed shrinkage rate which indicates the evaluation of the thermosetting property was obtained by the following method:

The filaments are left standing in the relaxed condition for 24 hours under a temperature and humidity condition of 20°±2° C., 65±2% RH. The constant length heat treatment is carried out for 1 minute in a silicone bath whose temperature is controlled at 200° C. After the heat treatment, the silicone is removed completely in a cold carbon tetrachloride bath. The filaments are then dried for 24 hours in a desiccator containing phosphorus pentoxide as the desiccant and heat treated in the relaxed condition in a 160° C. air bath for 30 minutes. The shrinkage rate at this time is measured.

In Table 2, the ratio of tenacity of the filament retained through the vulcanization with respect to the original tenacity of the filament was determined according to the following manner:

First, a specimen of poly-ε-caprolactam tire cord is embedded in a rubber stock followed by sandwiching the rubber stock containing the tire cord specimen between two steel molds.

Second, the steel molds are pressed at a pressure of 100 kg./cm.² and heated at a temperature of 170° C. for 15 minutes in order to cure the rubber stock.

Third, after completing the curing, the tire cord specimen is taken out from the cured rubber stock and then subjected to the measurement of tenacity. The tenacity-retaining ratio is calculated from the original and remaining tenacities of the tire cord specimen.

Tables 2A and 2B show a comparison of the characteristics of nylon 6 filaments which satisfy the condition of this invention (Nos. 1 and 3 to 10) and nylon 6 filaments which do not satisfy the conditions of this invention (Nos. 11 to 14) with respect to the work recovery rate and relaxed shrinkage rate.

Figure 5:
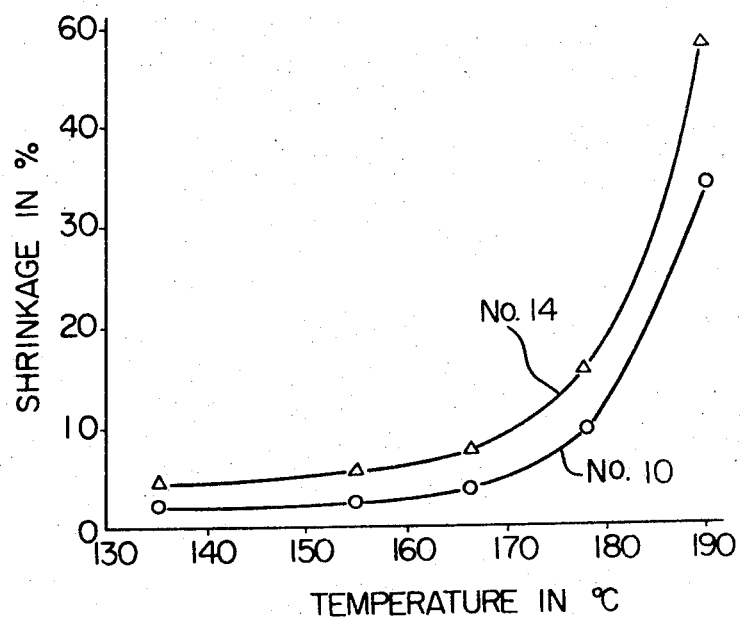
FIG. 5 is a graph showing the relation between temperature and shrinkage of a filament produced according to this invention and of a conventional nylon 6 filament.
Figure 6:
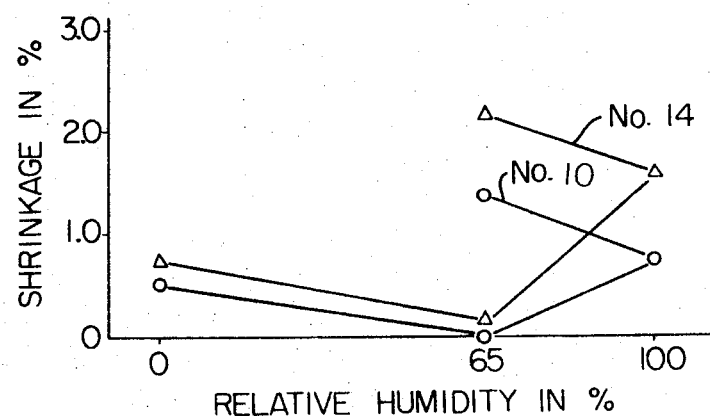
FIG. 6 is a graph showing the relation between relative humidity and shrinkage of a nylon 6 filament produced according to this invention and of a conventional nylon 6 filament.

Also, the relation between temperature and shrinkage rate, and relative humidity and shrinkage rate with respect to No. 10 and No. 14 are indicated in FIGS. 5 and 6. As is clear from Table 1, nylon 6 filaments which satisfy all of the conditions of this invention of $$\delta = 35° \pm 5°$$

$0.50 \leq I_M/I_P \leq 0.89$; $S \times E \geq 207.0$ and $15 \leq E \leq 35$ have better work recovery rate and thermosetting property than nylon 6 filaments which do not satisfy the aforementioned conditions and it has also been confirmed that they are superior with respect to other mechanical and physical properties, and are particularly suitable as yarns for tire cords.

EXAMPLE 2

Nylon 6 chips whose relative viscosity $\eta\gamma$ is 3.50, oligomer content 1.46% and moisture content 0.001% are melt spun at 315° C. Melt spinning is carried out with the conventional melt spinning equipment. The spun filaments are cooled from 315° C. to 40° C. within 0.09 second. The undrawn filaments thus produced are successively sent from the said spinning process and immediately drawn. This drawing process is composed of 4 stages of successive drawing zones and the total drawing rate with respect to the undrawn filaments is 5.28 in the last drawing zone. Seven examples (Nos. 15–21) when nylon 6 filaments have been manufactured while controlling the degree of appearance of birefringence in each drawing zone are indicated in Table 3.

As is clear from Table 3, drawing is carried out in the first stage or after the second stage such that at the least birefringence which can be measured is not indicated and then drawn to the total drawing rate in the subsequent drawing stages, and this is convenient because uniform and high efficiency drawing with little filament breakage and fibril formation during drawing can be carried out and, furthermore, the work recovery and thermosetting properties of the nylon 6 filaments obtained are better. Also, another characteristic of the filament manufacured in accordance with this invention is that the distribution of tenacity and breaking elongation is very small. Furthermore, Table 4 shows the $\delta$, $I_M/I_P$, $S \times E$, E, work recovery rate and relaxed shrinkage rate of Nos. 17, 18, 19 and 21 indicated in Table 3.

TABLE 3

| No. | | Drawing stage 1 | 2 | 3 | 4 | No. of times of filament breakage per 24 hours | No. of fibrils/ $10^4$ m. | Tenacity, g./d. | Breaking elongation, percent |
|---|---|---|---|---|---|---|---|---|---|
| 15 | R | 5.28 | | | | >170 | >24 | 8.99 (0.815) | 20.5 (1.01) |
|    | $\Delta n$ (×10⁻³) | 55.8 | | | | | | | |
| 16 | R | 4.00 | 5.28 | | | >150 | >20 | 9.05 (0.780) | 23.5 (0.80) |
|    | $\Delta n$ (×10⁻³) | 41.2 | 56.1 | | | | | | |
| 17 | R | 1.75 | 4.00 | 5.28 | | 5~7 | 1~2 | 9.15 (0.500) | 23.1 (0.40) |
|    | $\Delta n$ (×10⁻³) | (¹) | 40.3 | 57.8 | | | | | |
| 18 | R | 1.25 | 2.50 | 5.28 | | 1~10 | 3~5 | 9.25 (0.200) | 24.9 (0.35) |
|    | $\Delta n$ (×10⁻³) | (¹) | (¹) | 56.9 | | | | | |
| 19 | R | 1.50 | 3.50 | 4.25 | 5.28 | 1~5 | 5~7 | 9.13 (0.450) | 24.3 (0.45) |
|    | $\Delta n$ (×10⁻³) | (¹) | 39.1 | 45.3 | 57.1 | | | | |
| 20 | R | 3.50 | 4.25 | 4.75 | 5.28 | >50 | >20 | 9.01 (0.893) | 21.3 (0.89) |
|    | $\Delta n$ (×10⁻³) | 38.8 | 45.1 | 51.0 | 57.1 | | | | |
| 21 | R | 1.25 | 2.25 | 2.50 | 5.28 | 0~5 | 0~5 | 9.25 (0.150) | 25.3 (0.31) |
|    | $\Delta n$ (×10⁻³) | (¹) | (¹) | 1.2 | 57.8 | | | | |

¹ Unmeasurable.

NOTE.—R in the table indicates a draw ratio with respect to undrawn filaments in each drawing zone, $\Delta n$ is birefringence and figures in ( ) indicate dispersion.

TABLE 4

| No. | δ | $I_M/I_P$ | $S \times E$ | E | Work recovery rate at 16 percent elongation | Relaxed shrinkage, percent |
|---|---|---|---|---|---|---|
| 17 | 39.1 | 0.59 | 211.6 | 23.1 | 56.1 | 3.1 |
| 18 | 36.4 | 0.75 | 232.5 | 24.9 | 57.6 | 2.7 |
| 19 | 32.1 | 0.86 | 218.4 | 24.3 | 56.2 | 3.0 |
| 21 | 35.8 | 0.81 | 232.5 | 25.3 | 58.1 | 2.4 |

EXAMPLE 3

Nylon 6 chips whose relative viscosity ηγ is 3.3 are melt spun at 310° C. Melt spinning is carried out with the conventional melt spinning equipment. The total denier of the spun filaments was 4,400, number of filaments was 136. The undrawn filaments are successively sent to the drawing process at a velocity of 600 m./min. The content Cγ of the γ-form structure is controlled in each drawing zone in the drawing process so that it is as indicated in the 8 samples (Nos. 22–29) in Table 5.

TABLE 5

| No. | | Drawing stage | | | | No. of times filament breakage per 24 hours | No. of fibrils/ $10^4$ m. |
|---|---|---|---|---|---|---|---|
| | | 1 | 2 | 3 | 4 | | |
| 22 | $\Delta n$ (×10⁻³) | 51.3 | | | | (¹) | (²) |
| | Cγ | 0.47 | | | | | |
| 23 | $\Delta n$ (×10⁻³) | 37.5 | 52.9 | | | (¹) | (²) |
| | Cγ | 0.55 | 0.42 | | | | |
| 24 | $\Delta n$ (×10⁻³) | 41.2 | 53.5 | | | >50 | >20 |
| | Cγ | 0.63 | 0.42 | | | | |
| 25 | $\Delta n$ (×10⁻³) | (³) | 55.1 | | | 5~10 | 5~8 |
| | Cγ | 0.78 | 0.43 | | | | |
| 26 | $\Delta n$ (×10⁻³) | (³) | (³) | 56.9 | | 5~10 | 5~7 |
| | Cγ | 0.78 | 0.83 | 0.41 | | | |
| 27 | $\Delta n$ (×10⁻³) | (³) | (³) | 42.3 | 57.1 | 0~7 | 0~5 |
| | Cγ | 0.80 | 0.85 | 0.80 | 0.40 | | |
| 28 | $\Delta n$ (×10⁻³) | (³) | 4.5 | 21.3 | 56.4 | 8~10 | 5~7 |
| | Cγ | 0.64 | 0.65 | 0.65 | 0.41 | | |
| 29 | $\Delta n$ (×10⁻³) | (³) | (³) | 39.5 | 55.9 | 3~4 | 1~5 |
| | Cγ | 0.90 | 0.90 | 0.88 | 0.40 | | |

¹ Continuous drawing not possible.
² Very large amount.
³ Unmeasurable.

NOTE.—$\Delta n$ in the table indicates birefringence, Cγ the content of γ-for structure in each drawing zone.

As is clear from Table 5, in a method for manufacturing filaments in which the spinning process composed of melting nylon 6 chips with relative viscosity over 2.9, extruding through a spinneret and solidifying it, and the drawing process in which the undrawn filaments are drawn and carried out successively, the aforementioned drawing process is composed of more than 2 stages so that no measurable firefringence is indicated by the early drawing stages, and next drawn to the total drawing ratio by the drawing of the later stages, filament breakage and fibril formation are reduced when drawing is carried out such that the content Cγ of the γ-form structure of the filament in the drawing process is in the range of $$0.65 \leq C\gamma \leq 0.90$$

While the invention has been described in conjunction with certain embodiments thereof, it is to be understood that various changes and modifications may be made without departing from the spirit and scope of the invention.

What we claim and desire to secure by letters patent is:

1. A poly-ε-caprolactam filament spun and drawn from a poly-ε-caprolactam having a relative viscosity higher than 2.9 as determined in a solution of 0.250 g. of poly-ε-caprolactam in 25 cc. of 98% sulfuric acid at a temperature of 25° C. and having an X-ray low-angle four-point interference image in which an angle δ equal to 35°±5° is defined by a meridian and a straight line drawn from an intersection of said meridian and an equator line toward a point indicating a maximum strength in said X-ray low-angle four-point interference image; wherein a relation, $0.50 \leq I_M/I_P \leq 0.89$, exists between an interference strength $I_M$, measured along a line extending from said point of maximum strength to said meridian in parallel with said equator, and an interference strength $I_P$, measured along a line from said point of maximum strength to said intersection; and wherein said filament has a tenacity S measured in g./denier, and a breaking elongation value E measured in percent, said values S and E satisfying the expressions $$S \times E \geq 207.0, \text{ and } 15 \leq E \leq 35$$

2. A poly-ε-caprolactam filament as set forth in claim 1, in which said values of S and E are further limited as expressed by $$23 \leq E \leq 32, \text{ and } S \times E \geq 220.8$$

References Cited

UNITED STATES PATENTS

| | | | |
|---|---|---|---|
| 2,807,863 | 10/1957 | Schenker | 260—78 S |
| 3,134,833 | 5/1964 | Ciporin et al. | 260—78 S |
| 3,321,448 | 5/1967 | Hebeler | 260—78 S |
| 3,382,307 | 5/1968 | Ciceri et al. | 260—78 S |
| 3,365,874 | 1/1968 | Chidgey et al. | 260—78 S |
| 3,371,055 | 2/1968 | Illing et al. | 260—78 S |
| 3,376,369 | 4/1968 | Fisher | 260—78 S |
| 3,386,967 | 6/1968 | Twilley | 260—78 S |
| 3,459,845 | 8/1969 | Hebeler | 260—78 S |

OTHER REFERENCES

Kunstoffe: vol. 53, July 1963, pp. 11–21.

HAROLD D. ANDERSON, Primary Examiner

U.S. Cl. X.R.

57—140 R; 152—330; 156—117; 161—227; 260—78 A, 78 S; 264—210 F